United States Patent [19]

Ushiyama

[11] Patent Number: 5,071,525
[45] Date of Patent: Dec. 10, 1991

[54] METHOD OF GRINDING LENSES AND APPARATUS THEREFOR

[75] Inventor: Kazuo Ushiyama, Akishima, Japan

[73] Assignee: Olympus Optical Company Limited, Japan

[21] Appl. No.: 549,204

[22] Filed: Jul. 6, 1990

[30] Foreign Application Priority Data

Jul. 6, 1989 [JP] Japan .................... 1-174814

[51] Int. Cl.$^5$ .......... B23H 5/08; B23H 5/14; B23H 7/28; B23H 7/32
[52] U.S. Cl. ................... 204/129.46; 204/129.5; 204/129.7; 204/217; 204/224 M
[58] Field of Search .......... 204/129.46, 129.5, 224 M, 204/212, 129.6, 217

[56] References Cited

U.S. PATENT DOCUMENTS

| | | | |
|---|---|---|---|
| 3,445,372 | 5/1969 | Fromson | 204/212 |
| 3,669,867 | 6/1972 | Adachi | 204/212 X |
| 4,236,985 | 12/1980 | Grodzinsky et al. | 204/129.46 X |
| 4,849,599 | 7/1989 | Kuromatsu | 204/212 X |
| 4,956,056 | 9/1990 | Zubatova et al. | 204/DIG. 9 |

Primary Examiner—Donald R. Valentine
Attorney, Agent, or Firm—Bruce L. Adams; Van C. Wilks

[57] ABSTRACT

A method of grinding a lens and an apparatus therefor during dependent machining in which an electrically conductive grinding tool which rotates and a workpiece slide in close contact with each other on the work surface of the electrically conductive grinding tool. An anode is applied to the electrically conductive grinding tool, whereas a cathode is applied to an electrode which does not move together with the workpiece, while a fixed distance is maintained between the work surface of the electrically conductive grinding tool and the electrode. Grinding is thus performed with the aid of a weakly charged coolant fed between the electrically conductive grinding tool and the cathode.

27 Claims, 2 Drawing Sheets

METHOD OF GRINDING LENSES AND APPARATUS THEREFOR

BACKGROUND OF THE INVENTION

1. Field of the Invention

The present invention relates to an in-process grinding method which permits dressing during dependent machining, and to a rocking grinding apparatus which is used for grinding and abrading a plane or a spherical surface.

2. Description of the Related Art

FIG. 5 is a cross-sectional view partially showing the major components of a conventional grinding apparatus for a spherical surface during dependent machining.

As shown in FIG. 5, during the dependent machining, an end face, work surface of a workpiece 8 is in contact with the surface of a semi-spherical grinding tool 7 which is rotatably supported with the aid of a rotation shaft 6 connected to a drive source. A holding plate 10, having a plate shape and a pin 9 at its center, is pressed against the workpiece 8. The holding plate 10 tightly contacts the workpiece 8 to hold it. The spherical end of the pin 9 is free to rock. The surface of the workpiece 8 is thus ground to become a smooth spherical surface by the rocking motion caused by the holding plate 10.

Numeral 11 denoted above the grinding tool 7 indicates a coolant (a cooling medium) fed from an outside device through a pipe 12.

The grinding tool 7 is made of an alloy sintered in a heat treatment in which ground powder, such as a diamond powder, and metal power, such as Cu or Sn, are mixed.

In the above-mentioned grinding method, a problem exists in that a grind stone, that is, the grinding tool 7, clogs during grinding, thereby reducing the effectiveness of the grinding performance. As a result, the grinding time required is prolonged. In order to solve the problem, dressing is performed with a dressing tool while the workpiece is being ground.

Although there are forced grinding methods, such as creep-filled grinding or in-filled grinding, other than that mentioned above, a grind stone nevertheless clogs in both of these methods.

In order to solve the above problem, the following methods have been proposed in recent years.

"Grinding mirrors of a glass material with a cast iron fiber bond grinder", Lecture Treatise, Volume 1, Academic Lecture in the Autum Session of Precision Engineering, 1988, by Precision Engineering Corporation Aggregate, Oct. 5, 1988; "Grinding silicones with a cast iron fiber bond grinder", Lecture Treatise, Volume 3, Academic Lecture in the Autum Session of Precision Engineering, 1988, by Precision Engineering Corporation Aggregate, Oct. 5, 1988; and "Grinding electrolytically dressed mirrors of glass with an electrodeposited grinder", Lecture Treatise, Volume 1, Academic Lecture in the Spring Session of Precision Engineering, 1988, by Precision Engineering Corporation Aggregate, Mar. 22, 1989.

The technique discussed in the above-cited documents will be described with reference to FIG. 6, which is a side view showing the principle of the technique.

According to the technique, when a workpiece 34 is interposed to be ground between a grind stone 30 (a cast iron fiber bond diamond grind stone with finely ground powder) and an electrode 33, a weakly charged coolant 32 jets out to enhance in-process dressing effectiveness. At this time, the grind stone 30 becomes a positive electrode by connecting it to an electrolysis dressing power supply 36 through a charge-feeding brush 35, and the electrode 33, which is disposed between the grind stone 30 and a rotary table 31 opposite to the grind stone 30, becomes a negative electrode by connecting the electrode 33 to the electrolysis dressing power supply 36. With this arrangement, dressing can be performed during grinding. A coolant 37 for grinding is fed through the inside of the grind stone 30. The grind stone 30 and the rotary table 31 rotate respectively in the directions indicated by arrows in FIG. 6.

According to this method, the position of the grind stone (shaft) 30 and that of the negative electrode 33 are always fixed, and the negative electrode 33 and the grinding face of the grinding stone 30 are maintained with a fixed space therebetween. Further, grinding is performed so that the workpiece 40 and the negative electrode 33 above the rotary table 31 do not interfere with each other.

In such dependent machining as described above, as shown in FIG. 5, the periphery point L of the workpiece 8 rocks between the points I and O of the spherical surface associated with the grinding tool 7. In this case, the portion of the spherical surface of the grinding tool 7 between a point O and a periphery point e is where the workpiece 8 and the grinding tool 7 do not interfere with each other on the spherical surface of the grinding tool 7.

The grinding tool 7 is made to become a positive electrode, while on the contrary, the surface between the points O and e is made to become a negative electrode. When a weakly charged coolant is fed to the surface between the two points, the surface is electrolytically in-process dressed.

When the grinding tool 7 grinds on the spherical surface of the grinding tool 7 between a point C to which the axis of the rotation shaft 6 extends and the point e, however, there is a disadvantage in that the surface between the two points O and e is dressed, whereas the surface between the two points C and O is not dressed. That is, since the surface between the two points C and O is within the rocking range of the grinding tool 7, the grinding tool 7 cannot cover its rocking range if the negative electrode is fixed.

SUMMARY OF THE INVENTION

It is an object of the present invention to overcome the aforesaid problems and to provide a grinding method which permits dressing of the entire work surface of a grinding tool of a rocking grinding apparatus during dependent machining, and to provide an apparatus therefore.

In order to achieve the above-mentioned object, according to the present invention, a method of grinding a lens during dependent machining is disclosed in which an electrically conductive grinding tool rotates and a workpiece slides in close contact with each other on the work surface of the electrically conductive grinding tool, an anode is applied to the electrically conductive grinding tool, a cathode is applied to an electrode and does not move together with the workpiece, and a fixed distance is maintained between the work surface of the electrically conductive grinding tool and the electrode. Grinding is thus performed with the aid of a weakly charged coolant fed between the electrically conductive grinding tool and the cathode.

The operation according to the above apparatus will now be described together with reference to the accompanying drawings.

FIG. 1 is a plan view in cross section partially showing a grinding apparatus according to the present invention.

As shown in FIG. 1, the semi-spherical grinding face of a grinding tool 7 is in contact with the semi-spherical face of a workpiece 8, and this semi-spherical face of the lens or workpiece 8 is formed so as to correspond to the shape of the semi-spherical grinding face of the grinding tool 7. The grinding tool 7 with electrical conductivity is arranged at the end of a rotation shaft 6 so as to be integrated into the rotation shaft 6 which is connected to a drive (not shown). The workpiece 8 supported at the upper face by a holding plate 10 having substantially the same radius as that of the workpiece 8. At the center of the holding plate 10 is formed a concavity into which a pin 9 having a sphere at its tip fits. The pin 9 is arranged so as to rock by means of a drive source (not shown) which is connected to the end of the pin 9, and so as to press and machine the workpiece 8 by a pressurizing means with the aid of the holding plate 10.

The grinding apparatus according to the present invention is so constructed that a coolant (cooling medium) 11 may jet from a pipe 12, which is connected to a coolant supply device (not shown), onto the face between the workpiece 8 and the grinding tool 7.

The grinding tool 7 is made of a material in which ground powder such as a diamond power is bonded to a bond having electrical conductivity.

Numeral 13 in FIG. 1 designates a DC power supply which generates a pulse voltage for electric spark machining. The voltage at the positive electrode of the DC power supply 13 is applied through a brush 14 to the periphery wall of the rotation shaft 6 associated with the grinding tool 7.

The negative electrode of the DC power supply 13 is connected to the pin 9 which is coupled to the holding plate 10. The voltage at the negative electrode is applied through the holding plate 10 to an electrode 15 which is fixed to the outer periphery of the holding plate 10. Further, the electrode 15 is fixed to the outer periphery of the holding plate 10 so that a small gap l between the electrode 15 and the work surface of the grinding tool 7 is made, while the holding plate 10 holds workpiece 8. The coolant 11 is fed to the small gap l so that the work surface of the grinding tool 7 is dressed by means of electrolysis in accordance with the applied voltage.

A grinding method according to the above-described arrangement will now be described.

With the above-described arrangement, when the workpiece 8 begins to be ground, the holding plate 10 rocks and the grinding tool 7 rotates. The coolant supply device is concurrently made to drive to jet the coolant 11 through the pipe 12 to the gap l between the electrode 15 and the work surface of the grinding tool 7. Furthermore, the voltage applied from the DC power supply 13 to the grinding tool 7 and the electrode 15 generates electrolysis on the work surface (ground powder face) of the grinding tool 7, whereby the work surface of the grinding tool 7 is uniformly dressed.

After the workpiece 8 is completed with predetermined machining, it is replaced with another workpiece 8 to be ground. When such machining continues to be performed, the grinding tool 7 will gradually wear out. The gap l is, however, maintained regardless of the degree of wear on the grinding tool 7, because a workpiece 8 with a fixed size is available. The thickness of the workpiece 8 varies after it has been ground. However, the range of the variation is quite small, therefore the size of the gap l is deemed to be constant. Moreover, in the case of a workpiece 8 with an unfixed size, the position of the electrode 15 can be adjusted with respect to the holding plate 10 so as to readily maintain the gap l.

When the workpiece 8 is made of an electrically conductive material, an insulating material should be interposed between the workpiece 8 and the holding plate 10.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

Figure 1:
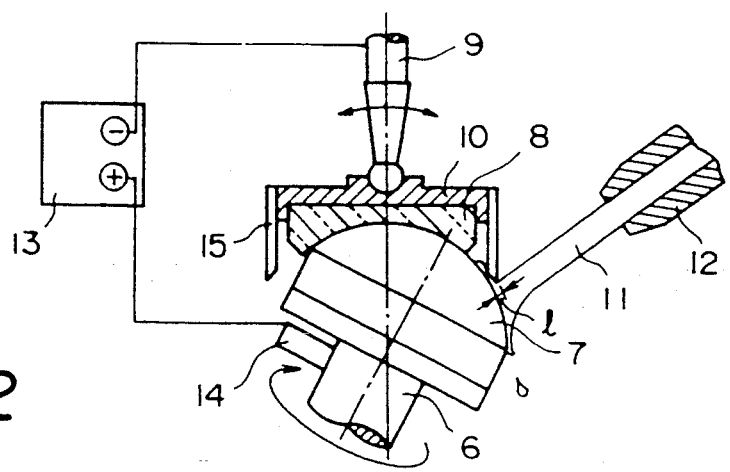
FIG. 1 is a plan view in cross section partially showing a grinding apparatus according to the present invention.

The embodiments of the present invention will be described with reference to the accompanying drawings.

Throughout the embodiments, like members or components are designated by the same reference characters. The explanations for such like members or components will be given in a first embodiment and will be omitted in a second embodiment or thereafter.

(First Embodiment)

Figure 2:
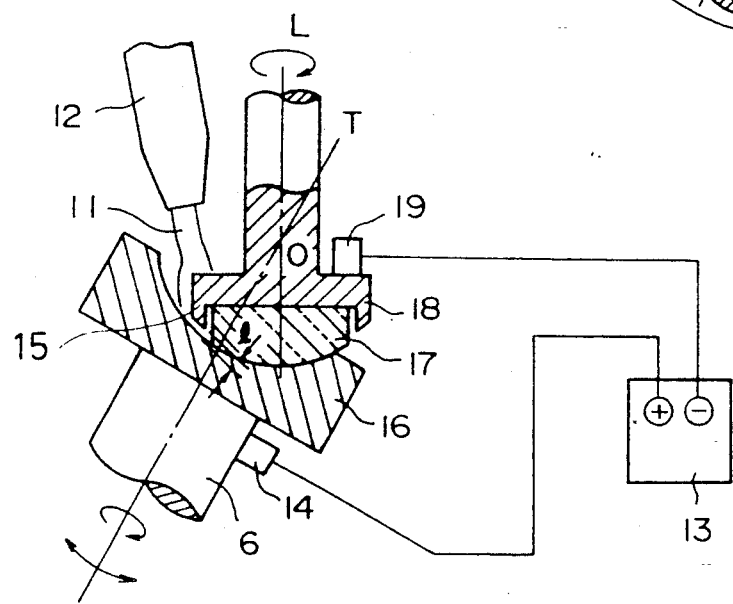
FIG. 2 is a plan view in cross section partially showing the major components of the grinding apparatus associated with a first embodiment according to the present invention.

FIG. 2 is a plan view in cross section partially showing the major components of a grinding apparatus associated with a first embodiment according to the present invention.

As shown in FIG. 2, the semi-spherical grinding face (concavity) of a grinding tool 16 is in contact with the semi-spherical face (convexity) of a workpiece 17, and this convexity of the workpiece 17 is formed so as to correspond to the shape of the concavity of the grinding tool 16. The grinding tool 16 with electrical conductivity is arranged at the end of a rotation shaft 6 so as to be integrated into the rotation shaft 6 which is connected to a drive (not shown). The workpiece 17 is supported at its upper face by a holding plate 18 having substantially the same radius as that of the workpiece 17. The base of a column is connected to the center of the holding plate 18. The column is constructed so as to rotate by means of a drive source (not shown) which is connected to the base of the column, and so as to press and machine the workpiece 17 by a pressurizing means (not shown) with the aid of the holding plate 18.

Furthermore, the holding plate 18 is so arranged that a small gap 1 (preferably 0.1-0.2 mm) is made between the work surface of the grinding tool 16 and the periphery of the holding plate 18, i.e., an electrode 15, while the workpiece 17 is being attached to the holding plate 18.

The grinding apparatus according to the present invention is so constructed so that a coolant (cooling medium) 11 jets from a pipe 12, which is connected to a coolant supply device (not shown), onto the face between the workpiece 17 and the grinding tool 16.

The grinding tool 16 is made of a material in which ground powder such as a diamond power is bonded to a bond having electrical conductivity.

Numeral 13 in FIG. 2 designates a DC power supply which generates a pulse voltage for electric spark machining. The voltage at the positive electrode of the DC power supply 13 is applied through a brush 14 to the periphery wall of the rotation shaft 6 associated with the grinding tool 16.

The negative electrode of the DC power supply 13 is connected to a brush 19 which is disposed on the upper face of the holding plate 18. The voltage at the negative electrode is applied through the holding plate 18 to an electrode 15 which is fixed to the outer periphery of the holding plate 18. Further, the electrode 15 is fixed to the outer periphery of the holding plate 18 so that the small gap 1 between the electrode 15 and the work surface of the grinding tool 16 is made, while the holding plate 18 holds workpiece 17. The coolant 11 is fed to the small gap 1 in such a manner that the work surface of the grinding tool 7 is dressed by means of electrolysis in accordance with the applied voltage.

A grinding method according to the above-described arrangement will now be described.

With the above-described arrangement, when the workpiece 17 begins to be ground, the holding plate 18 and the grinding tool 16 rotate. The coolant supply device is concurrently made to drive to jet the coolant 11 through the pipe 12 to the gap 1 between the electrode 15 and the work surface of the grinding tool 16. Furthermore, the voltage applied from the DC power supply 13 to the grinding tool 16 and the electrode 15 generates electrolysis on the work surface (ground power face) of the grinding tool 16, thereby the work surface of the grinding tool 16 is uniformly dressed.

(Second Embodiment)

Figure 3:
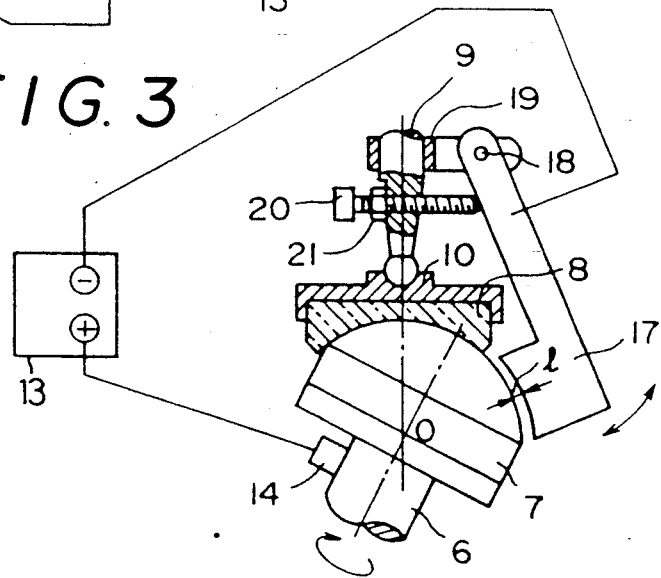
FIG. 3 is a plan view in cross section partially showing the major components of the grinding apparatus associated with a second embodiment according to the present invention.

FIG. 3 is a plan view in cross section partially showing the major components of the grinding apparatus associated with a second embodiment according to the present invention.

As shown in FIG. 3, the upper spherical surface of the grinding tool 7 is in contact with the spherical work surface of the workpiece 8 so that both the grinding tool 7 and the workpiece 8 respectively rotate. The shape of the upper spherical surface of the grinding tool 7 corresponds to that of the spherical surface of the workpiece 8. The grinding tool 7 is made of a grind stone which bonds material such as, diamond ground powder, Cu, Sn or Fe to electrically conductive resin, and is so arranged as to be integrated into the rotation shaft 6.

The workpiece 8 is supported at the upper face by means of a holding plate 10 having substantially the same radius as that of the workpiece 8.

At the center of the holding plate 10 is formed a concavity into which a pin 9 having a sphere at its tip fits. The pin 9 is so arranged as to rock and rotate the workpiece 8 with the aid of the holding plate 10, while pressing it.

That is, the pin 9 rocks with its axial line facing always toward the sphere core O. In other words, the pin 9 composes a so-called centripetally spherical grinding machine.

One end of a fixing member 19 which is normal to the axial line of the pin 9 runs through the upper portion of the pin 9.

The base of an L-shaped electrode 17 is attached to the other end of the fixing member 19 so as to rotate in the right and left directions, i.e., in a pendulum-like manner with respect to a support shaft 18.

An adjusting screw 20 at a desired position between the fixing member 19 and the sphere of the pin 9 fits into a threaded hole which is arranged at right angles with the axial line of the pin 9. The adjusting screw 20 is so disposed that its tip contacts the side face of the L-shaped electrode 17 in order to adjust the rotation angle of the electrode 17. That is, a lowest position limit of the rotation associated with the electrode 17 is adjusted, and the position of the L-shaped electrode 17 with respect to the grinding tool 7 is fixed with a fixing screw 21.

The lowest position limit of the rotation associated with the electrode 17 means a position in which the gap 1 between the electrode 17 and the grinding tool 7 is maintained while the pin 9 presses, with the aid of the holding plate 10, the workpiece 8 against the grinding tool 7.

When the electrode 17 is not necessary, e.g., when a workpiece 8 is replaced with another, the electrode 17 may be swung wide upwardly for easy replacement. In other words, the electrode 17 may be set to its lowest position only while machining is in progress.

The voltage at the positive electrode of the DC power supply 13 is applied through a brush 14 to the periphery wall of the rotation shaft 6 integrated into the grinding tool 7.

The voltage at the negative electrode of the DC power supply 13 is applied to the electrode 17.

According to the grinding method in the above-mentioned arrangement, when the workpiece 8 is pressed, by means of the pin 9 and the holding plate 10, against the grinding face of the grinding tool 7, and at the same time the grinding tool 7 is driven to rotate in the direction indicated by an arrow in FIG. 3, the projected end of the electrode 17 moves, together with the motion of the pin 9, above the grinding face of the grinding tool 7 while maintaining the gap 1. That is, a coolant (not shown) jets into the gap 1 in the same way as in the first embodiment between the grinding face of the grinding tool 7 and the electrode 17. The voltage applied to the grinding tool 7 and the electrode 17 makes it thus possible to uniformly dress the work surface of the grinding tool 7.

(Third Embodiment)

Figure 4:
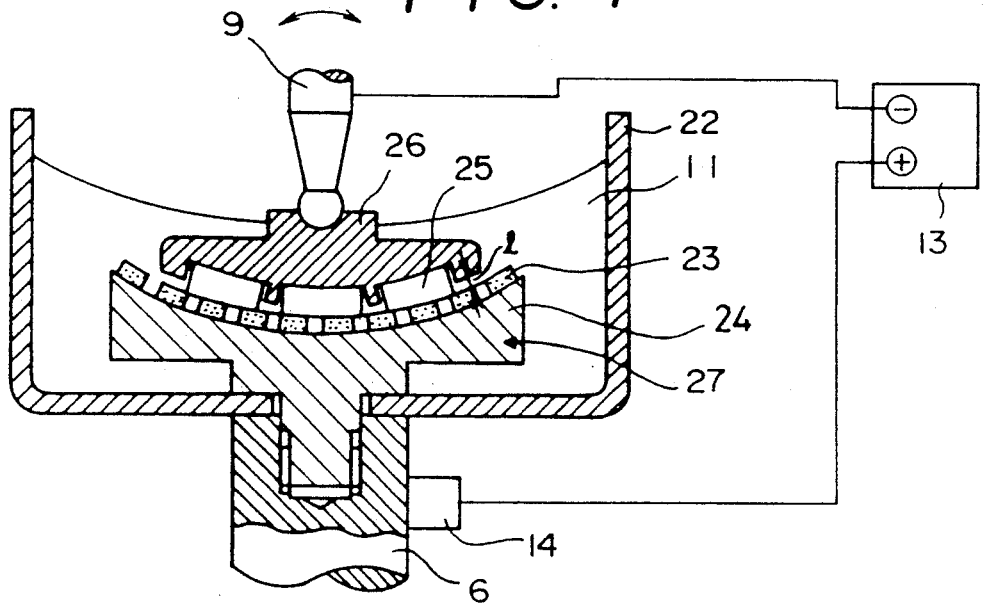
FIG. 4 is a plan view in cross section partially showing the major components of the grinding apparatus associated with a third embodiment according to the present invention.
Figure 5:
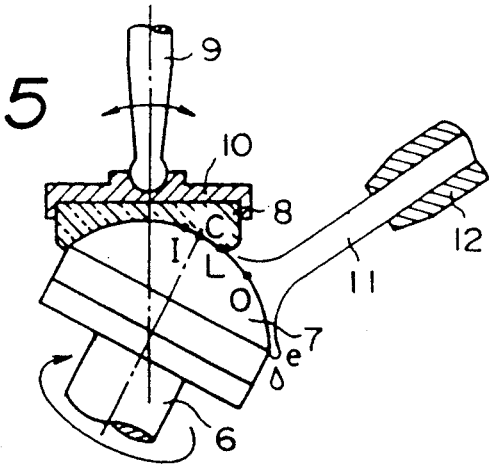
FIG. 5 is a cross-sectional view partially showing the major components of a conventional grinding apparatus.
Figure 6:
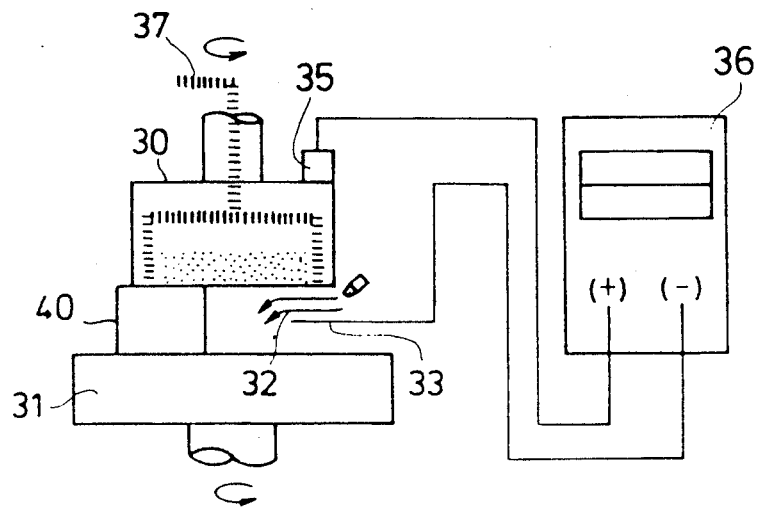
FIG. 6 is an explanatory side view showing the principle of the conventional grinding apparatus.

FIG. 4 is a plan view in cross section partially showing the major components of the grinding apparatus associated with a third embodiment according to the present invention.

At the center of the upper face of the rotation shaft 6 is provided a threaded hole into which the shaft of an electrically conductive grinding tool 27 fits. The shaft of the grinding tool 27 fits into the threaded hole of the rotation shaft 6 in such a way that the periphery of the center hole associated with a receptacle 22 which contains the coolant 11 is fastened in a watertight manner.

Formed on the surface of an electrically conductive saucer 24 is a concavity to which a number of pellet-like tools 23 are bonded with an electrically conductive bond.

The upper face of the grinding tool 27 has a radius of curvature whose axis is the same as that of an R forming face. A holding plate 26 which is spot-faced is arranged so as to hold a number of workpieces 25 with a bond or the like.

The upper center of the holding plate 26 protrudes for the formation of a concavity into which the sphere of the pin 9 fits correspondingly. The holding plate 26 is so arranged as to rocking in accordance with the rock motion caused by the pin 9.

The radius of curvature for the workpieces 25 and the depth of the spot-facing are predetermined in such a manner that the gap 1 between the surface of the holding plate 26 and the work surface of the grinding tool 27 is maintained under the machining conditions where the workpieces 25 are held on the grinding tool 27 while attached to the holding plate 26.

The voltage at the positive electrode of the DC power supply 13 is applied through a brush 14 to the periphery wall of the rotation shaft 6 integrated into the grinding tool 27.

The voltage at the negative electrode of the DC power supply 13 is applied to the pin 9.

The coolant 11 should be maintained in the receptacle 22 to an extent that the grinding tool 27 is submerged in it.

According to such a grinding method as described above, once a number of workpieces 25 are pressed and rocked with the aid of the pin 9, as well as the holding plate 26, and at the same time the grinding tool 27 is driven to rotate, then the grinding tool 27 and the holding plate 26 begin to rock and rotate together with the supplied coolant 11.

The coolant 11 seeps through the gap 1 between the holding plate 26 and the tools 23 of the grinding tool 27. The holding plate 26 serves as a negative electrode, since it is connected through the pin 9 to the negative electrode of the DC power supply 13, whereas the grinding 27 serves as a positive electrode, since it is connected through the rotation shaft 6 to the positive electrode of the power supply 13. The work surfaces of the tools 23 associated with the grinding tool 27 are thus uniformly dressed by the applied voltage.

According to the above-described embodiment, the entire surface of the grinding tool 27 can be efficiently dressed, not only because a dressing portion is provided inside the holding plate 26 but also because the coolant 11 is contained in the receptacle 22.

As has been described, according to the present invention, during dependent machining with a rocking grinding apparatus, a grinding tool face can be entirely dressed for effective grinding, because a negative electrode for electrolytic dressing is arranged so as to keep a fixed distance with respect to the work surface of the grinding tool and so as not to move together with a workpiece.

Although the illustrative embodiments of the present invention have been described in detail with reference to the accompanying drawings, it is to be understood that the present invention is not limited to those precise embodiments. Various changes or modifications may be effected therein by one skilled in the art without departing from the scope or spirit of the present invention.

What is claimed is:

1. A method of grinding a lens during dependent machining to grind a lens face, in which the lens slides along a work surface of the rotating grinding tool, in which the grinding tool is electrically conductive, and the work surface is semi-spherical and presses against the lens whose ground face is semi-spherical, and which is held so that it rotates with the rotation of the grinding tool; in which an anode is applied to said electrically conductive grinding tool; in which a cathode is applied to an electrode which does not move relative to said lens, while a fixed distance is maintained between the work surface of said electrically conductive grinding tool and said electrode; and in which the grinding is performed while rocking the electrically conductive, rotating grinding tool and the lens, and a weakly charged coolant is fed between said electrically conductive grinding tool and electrode.

2. A lens grinding apparatus in which a semi-spherical lens slides along a semi-spherical work surface of a rotating grinding tool, comprising: an electrically conductive grinding tool having a semi-spherical work surface; a holding member to hold and press the semi-spherical lens onto the work surface of the electrically conductive grinding tool so that it rotates with the rotation of the grinding tool; an electrode which does not move relative to the lens while maintaining a fixed distance between the work surface of the electrically conductive grinding tool and the electrode; a power supply for applying a charge of one polarity to the electrically conductive grinding tool and a charge of opposite polarity to said electrode; means for feeding weakly charged coolant between the work surface of the electrically conductive grinding tool and the electrode; and means for rocking the electrically conductive grinding tool and lens.

3. A lens grinding apparatus according to claim 2, wherein said holding member is said electrode.

4. A lens grinding apparatus according to claim 2, wherein said electrode is attached to said holding member.

5. A lens grinding apparatus according to claim 2, wherein the holding member holding said lens is so arranged that the gap between the periphery of said electrode to which said cathode is applied and said work surface of said grinding tool becomes 0.1–0.2 mm.

6. A lens grinding apparatus according to claim 2, wherein the axial line of a pin which pivotally supports said holding member always rocks the entire surface of the lens over the semi-spherical work surface of said grinding tool.

7. A lens grinding apparatus according to claim 2, wherein an L-shaped electrode is provided in the upper direction of a pin which pivotally supports the holding member and at the end of a fixing member which extends at right angles with the axial line of said pin, and wherein said L-shaped electrode to which said cathode is applied is pivotally supported by said fixing member.

8. A lens grinding apparatus according to claim 2, wherein a number of pellet-like tools are bonded with electrically conductive bond to said grinding tool, and the upper face of said grinding tool has a radius of curvature whose axis is the same as that of an R forming face, and wherein the holding member is a spot-faced holding member and is arranged so as to hold a number of lenses.

9. A lens grinding apparatus according to claim 2, in which the means for feeding weakly charged coolant comprises a receptacle attached to the shaft of the grinding tool in a watertight manner, the receptacle containing the grinding tool and coolant to depth at which at least the grinding tool is submerged.

10. A lens grinding apparatus according to the claim 9, wherein the distance between the electrode and the work surface is between 0.1 and 0.2 mm.

11. A lens grinding apparatus according to claim 2, in which said electrode has means for holding a number of said lenses.

12. A method of grinding a lens during dependent machining to grind a curved lens face, comprising the steps of: pressing the lens against an electrically conductive curved work surface of a rotating grinding tool; applying a charge of one polarity to the work surface; applying a charge of oposite polarity to an electrode which is stationary relative to the lens; maintaining a fixed distance between the work surface and the electrode; and supplying a charged coolant between the work surface and electrode.

13. A method of grinding a lens according to claim 12, further comprising the step of rotating the lens.

14. A lens grinding apparatus according to claim 13, wherein the electrode means is integral with holding means and is stationary relative to the lens.

15. A method for grinding a lens according to claim 12, further comprising the step of sliding the lens in a rocking motion across the work surface.

16. A method for grinding a lens according to claim 12, wherein the step of applying a change to work surface comprises the step of applying the charge by an anode.

17. A method for grinding a lens according to claim 12, wherein the step of applying an opposite charge to an electrode comprises the step of applying the opposite charge by a cathode.

18. A lens grinding apparatus for grinding a curved lens, comprising: holding means for holding at least one lens; rotationally driven grinding means having an electrically conductive curved work surface for grinding the lens; pressing means for pressing the lens and the work surface together; electrode means disposed at a predetermined distance from the work surface for applying an electrical force therebetween; coolant supplying a charged coolant between the work surface and the electrode; and charge supply means for supplying a charge of one polarity to the work surface and a charge of opposite polarity to the electrode means.

19. A lens grinding apparatus according to claim 18, further comprising means for rotating the lens.

20. A lens grinding apparatus according to claim 18, further comprising adjustment means for adjusting the distance between the work surface and the electrode.

21. A lens grinding apparatus according to claim 18, further comprising sliding means for sliding the lens in a rocking motion over the work surface.

22. A lens grinding apparatus according to claim 21, wherein the sliding includes a pin for pivotally supporting the holding means.

23. A lens grinding apparatus according to claim 18, wherein the change supply means includes an anode for supplying a charge of one polarity to work surface and a cathode for suppling a charge of the opposite to the electrode.

24. A lens grinding apparatus according to claim 18, wherein the charge supply means includes means for containing the charged coolant and at least the grinding tool submerged in the charged coolant.

25. A lens grinding apparatus according to claim 18, wherein the holding means for holding a plurality of lenses.

26. A lens grinding apparatus according to claim 18, wherein the work surface is comprised of a plurality of separate work surfaces.

27. A lens grinding apparatus according to claim 18, wherein the holding means includes a shaft, the electrode has an L-shape and is pivotally supported by the shaft and further comprising means for adjusting the distance between the electrode and the work surface.

* * * * *